(12) United States Patent
Khozikov et al.

(10) Patent No.: US 12,384,546 B2
(45) Date of Patent: Aug. 12, 2025

(54) ICE PROTECTION SYSTEM FOR A TRUSS-BRACED WING OF AN AIRCRAFT

(71) Applicant: The Boeing Company, Arlington, VA (US)

(72) Inventors: Vyacheslav Khozikov, Bellevue, WA (US); John R. Hull, Redmond, WA (US); Jeffrey Peter Baucum, Redmond, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/479,694

(22) Filed: Oct. 2, 2023

(65) Prior Publication Data
US 2025/0108928 A1    Apr. 3, 2025

(51) Int. Cl.
  *B64D 15/12* (2006.01)
  *B64D 15/22* (2006.01)
(52) U.S. Cl.
  CPC .............. *B64D 15/22* (2013.01); *B64D 15/12* (2013.01)
(58) Field of Classification Search
  CPC ........ B64D 15/00; B64D 15/02; B64D 15/04; B64D 15/06; B64D 15/08; B64D 15/10; B64D 15/12; B64D 15/14; B64D 15/16; B64D 15/163; B64D 15/166; B64D 15/20; B64D 15/22
  USPC ...................................................... 244/134 R
  See application file for complete search history.

(56) References Cited

U.S. PATENT DOCUMENTS

| | | | | |
|---|---|---|---|---|
| 1,795,664 | A * | 3/1931 | Mellberg | B64D 15/12 244/134 D |
| 9,469,408 | B1 * | 10/2016 | Elangovan | B64D 33/02 |
| 10,597,136 | B2 | 3/2020 | Genty De La Sagne | |
| 2004/0118969 | A1 * | 6/2004 | MacCready | B64D 37/30 244/5 |
| 2015/0246730 | A1 * | 9/2015 | Khozikov | B64D 15/12 244/134 D |
| 2016/0122025 | A1 * | 5/2016 | Hull | H05B 6/36 219/634 |
| 2017/0057618 | A1 * | 3/2017 | Khozikov | B64D 29/00 |
| 2017/0057644 | A1 * | 3/2017 | Khozikov | B64C 21/10 |
| 2017/0361936 | A1 * | 12/2017 | Hull | B64D 15/22 |

(Continued)

FOREIGN PATENT DOCUMENTS

EP    4173944 A1    5/2023

OTHER PUBLICATIONS

European Patent Office, Extended European Search Report Issued in Application No. 24197212.4, Feb. 26, 2025, Germany, 9 pages.

*Primary Examiner* — Joshua E Rodden
(74) *Attorney, Agent, or Firm* — Alleman Hall & Tuttle LLP

(57) ABSTRACT

A ice protection system for a truss-braced wing of an aircraft is disclosed. The system includes a wing, a support strut, a joint coupling the support strut to the wing to form a structural truss of the truss-braced wing, a magnetic susceptor disposed on or within the joint, and an induction heating coil disposed on or within the truss-braced wing. The induction heating coil is configured to generate eddy currents inside the magnetic susceptor based on being driven with an alternating current (AC) excitation current. The eddy currents circulate through the magnetic susceptor causing joule heating of the magnetic susceptor to inhibit ice accumulation on the joint.

20 Claims, 8 Drawing Sheets

(56) References Cited

U.S. PATENT DOCUMENTS

| | | | | |
|---|---|---|---|---|
| 2022/0361300 A1* | 11/2022 | Hull | ................ | H05B 6/105 |
| 2023/0002064 A1* | 1/2023 | Kestler | ................ | H05B 6/707 |
| 2023/0002065 A1* | 1/2023 | Kestler | ................ | H05B 6/6491 |
| 2023/0348073 A1* | 11/2023 | Kestler | ................ | B64D 15/12 |

* cited by examiner

ICE PROTECTION SYSTEM FOR A TRUSS-BRACED WING OF AN AIRCRAFT

FIELD

The present disclosure relates generally to the field of aircraft, and more specifically to aircraft having a truss-braced wing.

BACKGROUND

A truss-braced wing is typically a long, slender wing structurally braced by one or more trusses. The structural support provided by the trusses allows for the span of the wing, and correspondingly the aspect ratio of the wing to be increased relative to a conventional cantilevered wing. The increased aspect ratio of the truss-braced wing reduces lift-induced drag relative to a conventional cantilevered wing. Moreover, laminar flow is created where the supporting struts attach to the truss-braced wing, and that laminar flow provides additional lift to the aircraft. The reduced lift-induced drag and increased lift provided by the truss-braced wing allows for an aircraft that employs the truss-braced wing to have, in some settings, increased efficiency/reduced fuel consumption relative to a conventional aircraft having cantilevered wings.

A truss-braced wing is subject to ice accumulation during freezing environmental conditions, the same as or more so than a conventional cantilevered wing. In particular, ice accumulation can occur at joints where struts that form a truss of the truss-braced wing couple to the wing itself. There are several common approaches for protecting a conventional cantilevered wing from ice accumulation. As one example, conductive elements, also known as electric heating mats or blankets, can be integrated onto the leading-edge surface of a cantilevered wing to directly heat the cantilevered wing via conduction in order to keep ice from accumulating on the cantilevered wing. Typically, the electric heating mats draw power from an accessory generator of the aircraft. As another example, hot air can be bled from the engines of the aircraft through a series of ducts (e.g., piccolo tubes), which circulate the bleed air under the cantilevered wing surface to keep ice from accumulating on the cantilevered wing.

However, these conventional approaches for protecting a cantilevered wing of an aircraft from ice accumulation may be less efficient or not feasible when applied to a truss-braced wing of an aircraft. In particular, the extended length of the truss-braced wing would require a significant increase in the number of electric heating mats necessary to span the entire length of the truss-braced wing. The increased number of heating mats would require an amount of energy per a unit length of the wing for ice protection that would increase power consumption of the aircraft aggregately for the entire length of the wing that would reduce efficiency of the aircraft. Moreover, the electric heating mats require fasteners that disrupt the smooth surface of the truss-braced wing and negatively affects the laminar flow formed around the truss-braced wing. Furthermore, the slender dimensions of the truss-braced wing limits a size and throughput of a ducting system for bleed air to be distributed across the truss-braced wing to the point that the bleed air would be ineffective at keeping ice from accumulating on the truss-braced wing. Moreover, none of these conventional approaches specifically address the issue of ice accumulation on a structural joint of a wing, since conventional cantilevered wings lack such joints.

SUMMARY

An ice protection system for a truss-braced wing of an aircraft is disclosed. The system includes a wing, a support strut, a joint coupling the support strut to the wing to form a structural truss of the truss-braced wing, a magnetic susceptor disposed on or within the joint, and an induction heating coil disposed on or within the truss-braced wing. The induction heating coil is configured to generate eddy currents inside the magnetic susceptor based on being driven with an alternating current (AC) excitation current. The eddy currents circulate through the magnetic susceptor causing joule heating of the magnetic susceptor to inhibit ice accumulation on the joint.

The features, functions, and advantages that have been discussed can be achieved independently in various embodiments or may be combined in yet other embodiments, further details of which can be seen with reference to the following description and drawings.

DETAILED DESCRIPTION

Figure 1:
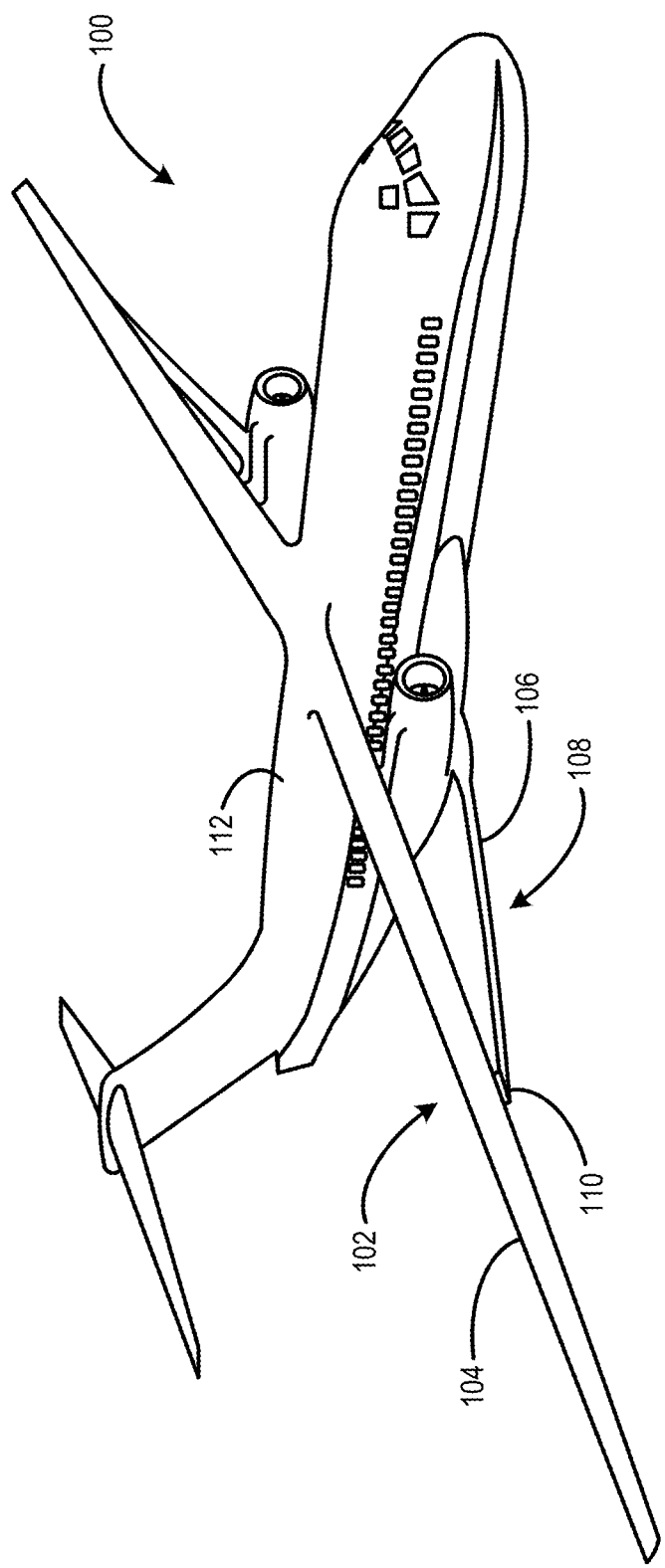
FIG. 1 shows an example embodiment of an aircraft that has a truss-braced wing.

Conventional approaches for protecting a cantilevered wing of an aircraft from ice accumulation may be less efficient or not feasible when applied to a truss-braced wing. As one example, a truss-braced wing is significantly longer than a conventional cantilevered wing, and the extended length of the truss-braced wing would require a significant number of electric heating mats in order to span the entire length of the truss-braced wing. The significant number of heating mats would likely increase weight and power consumption (if all heating mats are turned on simultaneously) that would reduce efficiency of the aircraft. Moreover, the electric heating mats require fasteners that disrupt the smooth surface of the truss-braced wing and negatively affect the laminar flow formed around struts of the truss-braced wing. As another example, the slender dimensions of the truss-braced wing could limit the size and throughput of a ducting system for bleed air to be distributed across the truss-braced wing to the point that the volume of bleed air that could be delivered to the truss-braced wing would be ineffective at keeping ice from accumulating on the truss-braced wing.

Accordingly, the present disclosure is directed to approaches for protecting a truss-braced wing of an aircraft from ice accumulation. Such approaches are more effective and efficient than conventional approaches for protecting a cantilevered wing of an aircraft from ice accumulation. In one example, an ice protection system for a truss-braced wing of an aircraft includes a wing, a support strut, a joint coupling the support strut to the wing to form a structural truss of the truss-braced wing, a magnetic susceptor disposed on or within the joint, and an induction heating coil disposed on or within the truss-braced wing. The induction heating coil is configured to generate eddy currents inside the magnetic based on being driven with an alternating current (AC) excitation current. The eddy currents circulate through the magnetic susceptor causing joule heating of the magnetic susceptor to inhibit ice accumulation on the joint.

Use of the magnetic susceptor in the ice protection system provides the technical benefit of being able to integrate the magnetic susceptor into the structure of the joint of the truss-braced wing so as not to negatively affect aerodynamics of the truss-braced wing or laminar flow across the truss-braced wing, whereas fasteners of conventional electric heating mats would negatively affect aerodynamics and/or laminar flow.

Moreover, composite structures that are exposed to airflow and in the path of direct water impingement, such as a leading edge of a wing, are subject to rain erosion. By disposing a magnetic susceptor on such composite structures, the magnetic susceptor provides the added benefit of protection against rain erosion in addition to the protection from ice accumulation.

Furthermore, the magnetic susceptor can be configured such that a Curie temperature of the magnetic susceptor is selected based at least on the material of the truss-braced wing so that the magnetic susceptor can intelligently heat the truss-braced wing up to the Curie temperature without causing degradation of the material of the truss-braced wing due to excessive heating.

Use of the induction heating coil to heat the magnetic susceptor without having to be in direct physical contact with the magnetic susceptor provides the technical benefit of having design flexibility to accommodate the slender internal dimensions of the truss-braced wing. For example, the induction heating coil can have a low profile (e.g., the thickness of the Litz wire that forms the coil can be a lower American wire gauge (AWG)) and merely requires an electrical connection to a controller via a cable that can be flexibility fed through the internal dimension of the truss-braced wing. Such an ice protection system provides more design flexibility and has reduced weight and cost relative to a conventional bleed air system that requires a series of ducts to be arranged internally within a wing.

FIG. 1 shows an example embodiment of an aircraft 100 that has a truss-braced wing 102. The truss-braced wing 102 includes a wing 104 and a support strut 106 that collectively form a structural truss 108 that provides additional support and stiffness to the truss-braced wing 102. In the illustrated embodiment, the support strut 106 is a jury strut. In other embodiments, the support strut may be a different type of strut, such as a lift strut. A joint 110 couples the support strut 106 to the wing 104 to form the structural truss 108. The support strut 106 spans between the joint 110 and a fuselage 112 of the aircraft 100. This design of the truss-braced wing 102 allows for a longer and thinner wing to be employed. As a wing gets longer, the aspect ratio of the wing increases and improves aerodynamic efficiency. Higher aspect ratios generally improve lift-to-drag ratios, resulting in better fuel efficiency and range. Also, as the wing gets longer, the wing becomes more flexible, leading to increased bending and twisting during flight. This flexibility can create structural challenges and may require additional weight to maintain the wing's structural integrity. The truss-braced wing 102 helps overcome these issues by providing a lightweight, high-strength structure that supports the longer wingspan without significantly increasing weight. In particular, the structural truss 108 helps distribute loads more efficiently without the need for heavy internal reinforcements and allowing for lighter materials to be employed to construct the truss-braced wing 102.

Figure 2:
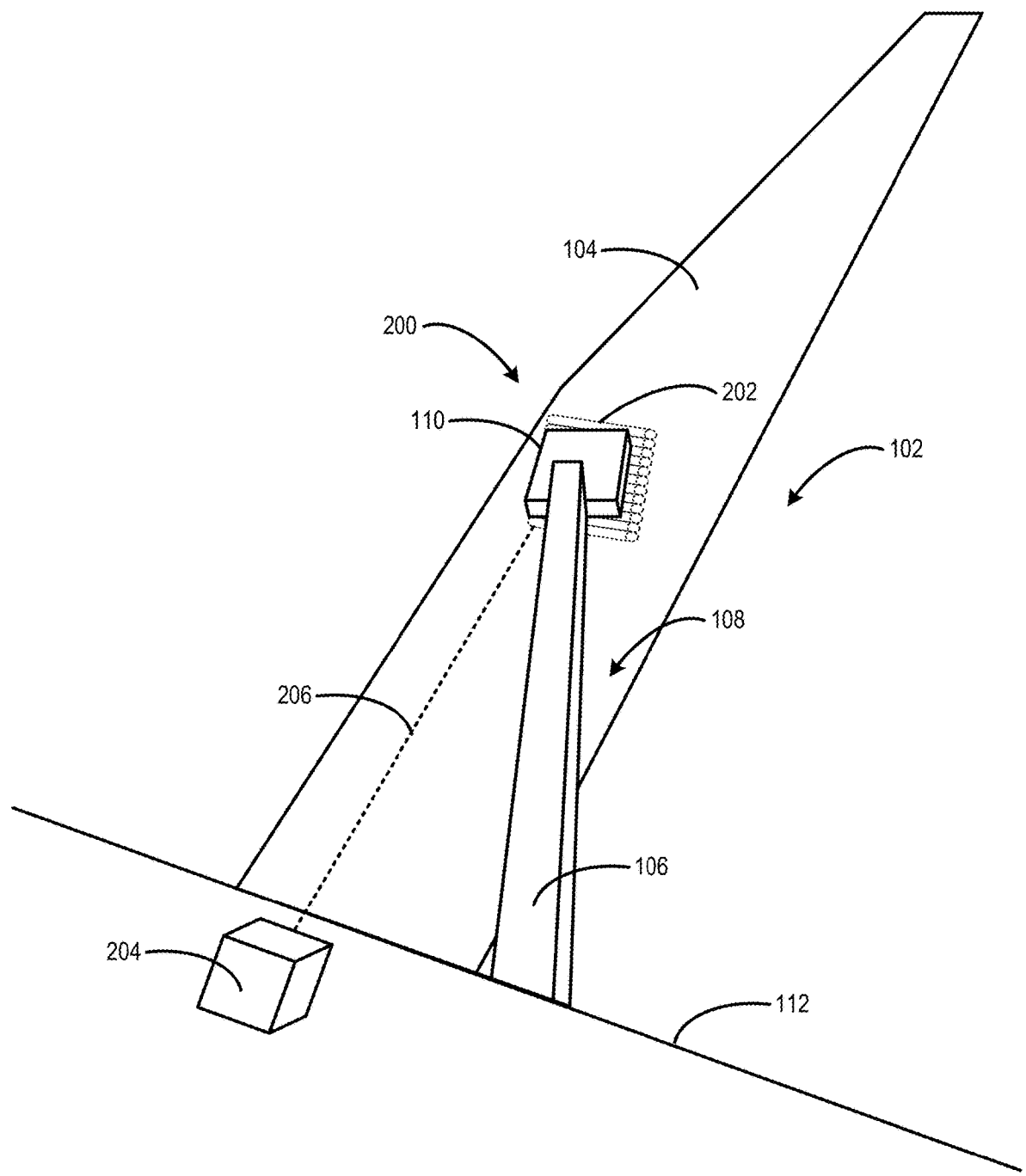
FIG. 2 schematically shows an example embodiment of an ice protection system 200 for the truss-braced wing of the aircraft of FIG. 1.
Figure 3:
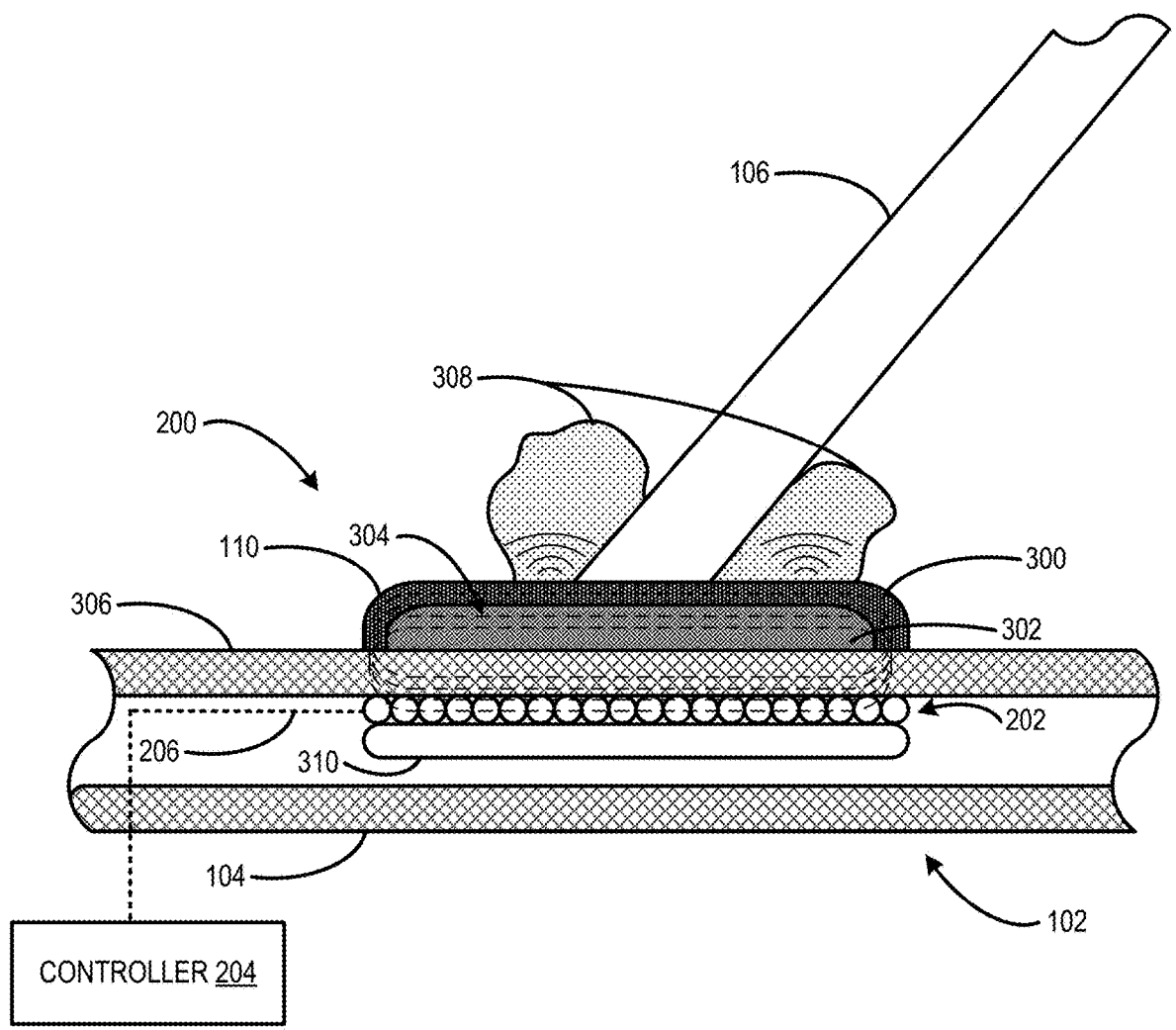
FIG. 3 schematically shows an example embodiment of an ice protection system for a truss-braced wing that includes a magnetic susceptor incorporated into a joint of the truss-braced wing.

The truss-braced wing 102 is subject to ice accumulation during freezing environmental conditions, especially around the joint 110 due to its geometric features (e.g., corners, edges) and local airflow across the joint 110. Accordingly, the aircraft 100 includes an ice protection system configured to inhibit ice accumulation on the truss-braced wing 102. FIGS. 2-3 schematically show an example ice protection system 200 according to one embodiment of the present disclosure. FIG. 2 schematically shows an underside view of the truss-braced wing 102 including the ice protection system 200. FIG. 3 schematically shows a partial cross-section view of the truss-braced wing 102 including the ice protection system 200.

The ice protection system 200 includes a magnetic susceptor that is incorporated into the joint 110 in this embodiment and is referred to herein as the magnetic susceptor joint 110. The magnetic susceptor joint 110 is disposed on the wing 104. The magnetic susceptor joint 110 couples the support strut 106 to the wing 104 to form the structural truss 108 of the truss-braced wing 102. The magnetic susceptor joint 110 may couple the support strut 106 to the wing 104 in any suitable manner (e.g., bonded, fasteners).

Note that in the illustrated embodiment the dimensions of the magnetic susceptor joint 110 are exaggerated for ease of viewing. In practice, the dimensions of the magnetic susceptor joint 110 may be different. For example, the magnetic susceptor joint may be shifted downwards/integrated into the body of the wing 104, such that the height of the magnetic susceptor joint 110 is negligible. In some embodiments, the support strut 106 may be coupled (e.g., via fasteners, bonding) directly to the wing 104 to form a joint and the magnetic susceptor may be integrated into the support strut 106 and/or the wing 104 in the area surrounding the joint.

The magnetic susceptor joint 110 comprises a ferromagnetic material (e.g., an alloy) that is configured to absorb electromagnetic (EM) energy and convert the electromagnetic energy into heat via induction in order to inhibit ice accumulation on the magnetic susceptor joint 110 and the surrounding area on the wing 104.

In some embodiments, the magnetic susceptor joint 110 comprises an alloy that is selected for having a Curie temperature that is less than a minimum temperature at which a material of the truss-braced wing 102 becomes degraded due to excessive heating. In particular, when the alloy of the magnetic susceptor joint 110 is heated to a temperature that is greater than the Curie temperature of the alloy, the alloy transitions from being ferromagnetic to being paramagnetic. When the alloy becomes paramagnetic, the alloy stops absorbing EM energy, and thus induction heating of the alloy stops. This phenomenon allows for the Curie temperature of the alloy of the magnetic susceptor joint 110 to be used as a temperature set point to control joule heating to inhibit ice accumulation without causing degradation of the truss-braced wing 102 due to excessive heating. In one example, the truss-braced wing 102 comprises composite material and the alloy of the magnetic susceptor joint 110 has a Curie temperature at or below 160° F. that is less than a degradation temperature of the composite material. In another example, the truss-braced wing 102 comprises aluminum and the alloy of the magnetic susceptor joint 110 has a Curie temperature at or below 300° F. that is less than a degradation temperature of the aluminum.

In some embodiments, the magnetic susceptor joint 110 is configured such that a magnetic permeability of the magnetic susceptor joint 110 varies throughout the magnetic susceptor joint 110. As shown in FIG. 3, the magnetic susceptor joint 110 comprises an exterior surface portion 300 that has a higher magnetic permeability than an interior portion 302. The relatively higher magnetic permeability of the exterior surface portion 300 of the magnetic susceptor joint 110 allows for more EM energy to be absorbed by the exterior surface portion 300, such that induction heating is concentrated on the exterior surface portion 300 to target areas where ice is more likely to form. The relatively lower magnetic permeability of the interior portion 302 of the magnetic susceptor joint 110 causes the interior portion 302 to be heated to a lesser degree so as to provide a thermal buffer to other materials of the truss-braced wing 102 that are proximate to the magnetic susceptor joint 110.

In the illustrated embodiment, the magnetic susceptor joint 110 is depicted as having the exterior surface portion 300 and the interior portion 302 with different degrees of magnetic permeability. It will be appreciated that the magnetic permeability of the magnetic susceptor joint 110 may vary in any suitable manner. In other embodiments, the magnetic permeability of the magnetic susceptor joint 110 may have a gradient that varies across the thickness of the magnetic susceptor joint 110, for example, such that absorption of EM energy varies as a function of thickness of the magnetic susceptor joint 110.

The magnetic susceptor joint 110 can be fabricated in any suitable manner to achieve the varying magnetic permeability of the magnetic susceptor joint 110. In some embodiments, the magnetic susceptor joint 110 can be additively manufactured to achieve the varying magnetic permeability of the magnetic susceptor joint 110. In other embodiments, the magnetic susceptor joint 110 can be fabricated with a first material that has a first magnetic permeability and then the magnetic susceptor joint 110 is surface coated with a second material having a second magnetic permeability that is higher than the first magnetic permeability. In some embodiments, the magnetic susceptor joint 110 can be fabricated via a spray on process that forms a plurality of layers of different alloys having different magnetic permeabilities.

The ice protection system 200 further includes an induction heating coil 202 disposed within the wing 104 in this embodiment. More particularly, the truss-braced wing 102 comprises a composite skin 306 that coats the exterior of the wing 104. The induction heating coil 202 is disposed within the truss-braced wing 102 such that the composite skin 306 is positioned intermediate the induction heating coil 202 and the magnetic susceptor joint 110. The induction heating coil 202 may have any suitable pitch and/or length to provide enough EM energy to the magnetic susceptor joint 110 to provide joule heating for ice protection on the magnetic susceptor joint 110 and/or the wing 104. Because the ice protection system 200 employs induction heating, the induction heating coil 202 does not have to be in contact with the magnetic susceptor joint 110. This allows flexibility in arranging the induction heating coil 202 on or within the wing 104 to accommodate other structures as needed. In some other embodiments, the induction heating coil 202 can be disposed on a surface of the wing 104 or incorporated into a material of the wing 104.

In some embodiments, the ice protection system 200 may include a concentrator 310 positioned adjacent to the induction heating coil 202. The concentrator may be configured to modify the magnetic flux to increase the efficiency of the joule heating of the induction heating coil 202. In some configurations, the concentrator may be installed to reflect, or focus, the magnetic field created by the induction heating coil 202 towards the magnetic susceptor joint 110. Also, the concentrator may help to insulate other components (not shown) from the magnetic field created by the induction heating coil 202.

As shown in FIG. 2, the induction heating coil 202 is electrically coupled to a controller 204 via an electrical cable 206. The controller 204 is positioned within the fuselage 112 of the aircraft 100 (e.g., in a pressurized compartment of the aircraft 100). The controller 204 is configured to act as a power supply for the induction heating coil 202. More particularly, the controller 204 is configured to drive the induction heating coil 202 with a high-frequency alternating current (AC) excitation current (e.g., 100 kHz). The induction heating coil 202 is configured to generate a time-varying EM field based on being driven by the high-frequency AC excitation current.

As shown in FIG. 3, the time-varying EM field induces eddy currents 304 that circulate through the magnetic susceptor joint 110 causing joule heating of the magnetic susceptor joint 110 that inhibits ice 308 from accumulating on the magnetic susceptor joint 110 and surrounding area on the wing 104. The ice protection system 200 may be configured to generate any suitable amount of heat to inhibit ice accumulation on the truss-braced wing 102.

The controller 204 may have different levels of control intelligence depending on the embodiment. In some embodiments, the controller 204 is configured to drive the magnetic susceptor joint 110 with the AC excitation current at a fixed voltage and a fixed frequency. For example, the ice protection system 200 may be manually turned on and off via a switch in the cockpit of the aircraft 100, and the controller 204 provides the high-frequency AC excitation current to the induction heating coil 202 while the ice protection system 200 is turned on. In this embodiment, the Curie temperature of the magnetic susceptor joint 110 acts as a temperature set point that allows for heating to inhibit ice accumulation while not overheating the materials of the truss-braced wing 102 to the point of causing degradation.

In other embodiments, the controller 204 is configured to drive the induction heating coil 202 with the high-frequency AC excitation current. Further, the controller 204 is configured to sense an impedance of the induction heating coil and adjust a parameter of the high-frequency AC excitation current based on the sensed impedance of the induction heating coil. For example, the controller 204 may adjust a voltage of the high-frequency AC excitation current to achieve a desired level of heating for the specific operating conditions of the aircraft to inhibit ice accumulation on the truss-braced wing 102.

In still other embodiments, the ice protection system 200 may include one or more temperature sensors that are electrically coupled to the controller 204. The temperature sensor(s) are configured to send signals to the controller 204 indicating ambient temperatures at different areas of the truss-braced wing 102. The controller 204 is configured to adjust a parameter of the high-frequency AC excitation current based on the signals received from the temperature sensor(s) to achieve a desired level of heating for the specific operating conditions of the aircraft to inhibit ice accumulation on the truss-braced wing 102.

The controller 204 may take any suitable form of computer hardware, software, and/or firmware to control operation of the induction heating coil 202. In some embodiments, the controller 204 is configured to control operation of a plurality of induction heating coils dispersed throughout different areas of a wing or wings of the aircraft 100. In these embodiments, the controller 204 operates according to a centralized control regime. In other embodiments, a plurality of different controllers may be dispersed throughout the aircraft 100 to control different induction heating coils. In these embodiments, the controllers operate according to a decentralized control regime in which the controller and induction heating coils have a one-to-one correspondence and can act independently from the other controllers.

Figure 4:
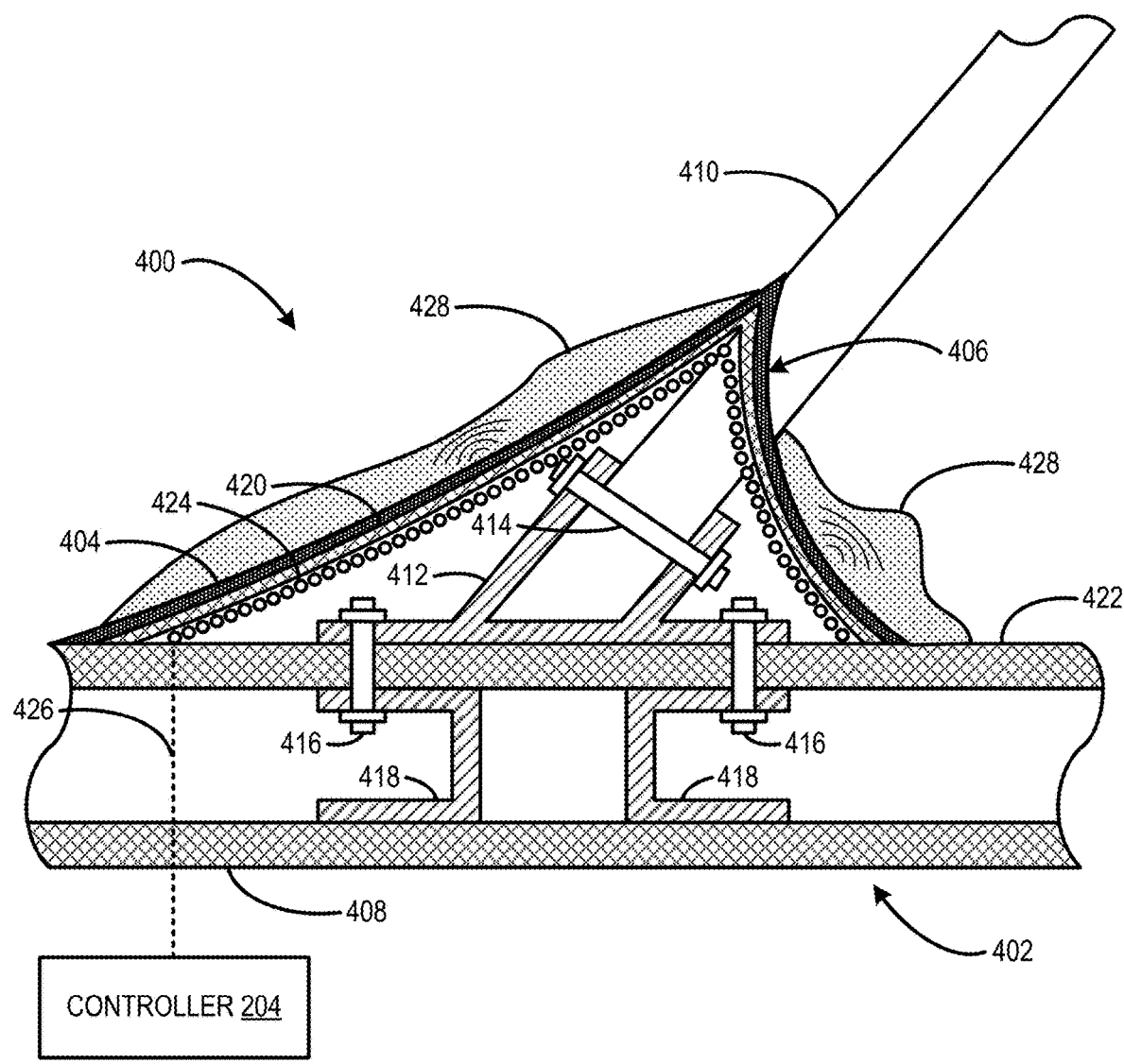
FIG. 4 schematically shows another example embodiment of an ice protection system for a truss-braced wing that includes a magnetic susceptor incorporated into an aerodynamic fairing of the truss-braced wing.

In some embodiments, a truss-braced wing may include an aerodynamic fairing to enclose the joint that couples the support strut to the wing in order to improve aerodynamics of the truss-braced wing and/or to protect the joint from other environmental effects, such as corrosion, foreign objects, and ice formation. FIG. 4 schematically shows an example embodiment of an ice protection system 400 for a truss-braced wing 402 that includes a magnetic susceptor 404 incorporated into an aerodynamic fairing 406 of the truss-braced wing 402. The truss-braced wing 402 includes a wing 408 and a support strut 410 that is coupled to the wing 408 via a joint 412. In particular, the support strut 410 is coupled to the joint 412 via a fastener 414. The joint 412 is further coupled to a mounting structure 418 that is disposed within the wing 408 via fasteners 416. The joint 412 and the plurality of fasteners 414, 416 form geometry that could potentially reduce laminar flow across the truss-braced wing 402. As such, the truss-braced wing 402 comprises the aerodynamic fairing 406 that at least partially covers the joint 412 and the plurality of fasteners 414, 416 to improve aerodynamics and increase laminar flow across the truss-braced wing 402. In some embodiments, the aerodynamic fairing 406 encloses the joint 412 and the plurality of fasteners 414, 416 on the surface of the wing 408.

Note that the support strut 410 can be coupled to the joint 412 and the joint 412 can be coupled to the wing 402 using any suitable number of fasteners. Alternatively or additionally, the support strut 410 can be bonded to the joint 412 and the joint 412 can be bonded to the wing 402.

The aerodynamic fairing 406 comprises the magnetic susceptor 404 that is disposed on an external surface of the aerodynamic fairing 406. The magnetic susceptor 404 may be disposed on the surface of the aerodynamic fairing 406 in any suitable manner (e.g., spray coated, deposited, bonded, additively manufactured).

The aerodynamic fairing 406 further comprises a composite layer 420 that is coupled (e.g., bonded) to a composite skin 422 of the wing 408. The composite layer 420 allows for the aerodynamic fairing 406 to couple to the wing 408 in a smooth manner so as to improve aerodynamics.

An induction heating coil 424 is disposed underneath the aerodynamic fairing 406. For example, the induction heating coil 424 may be coupled to or otherwise incorporated into the composite layer 420. The induction heating coil 424 is electrically coupled to the controller via an electrical cable 426. The controller 204 is configured to drive the induction heating coil 424 with a high-frequency AC excitation current. The induction heating coil 424 is configured to generate a time-varying EM field based on being driven by the high-frequency AC excitation current. The time-varying EM field induces eddy currents that circulate through the magnetic susceptor 404 on the surface of the aerodynamic fairing 406 causing joule heating of the magnetic susceptor 404 that inhibits ice 428 from accumulating on the aerodynamic fairing 406 and surrounding area on the wing 408.

In some embodiments, the induction heating coil 424 may be disposed within the wing 408 instead of underneath the aerodynamic fairing 406. In such embodiments, the induction heating coil 424 may generate an EM field suitably large enough to induce eddy currents through the magnetic susceptor 404 disposed on the surface of the aerodynamic fairing 406.

Figure 5:
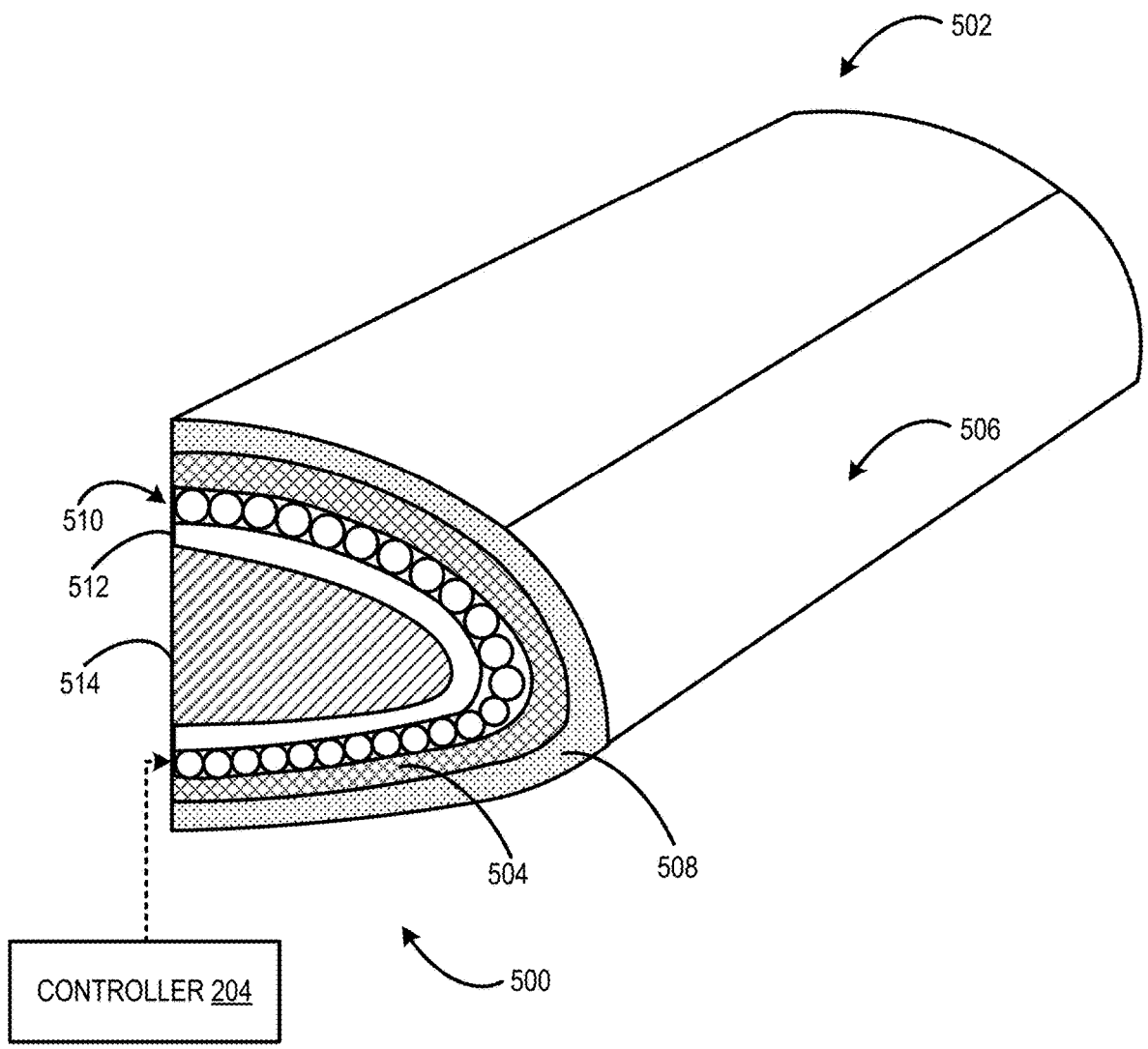
FIG. 5 schematically shows another example embodiment of an ice protection system for a truss-braced wing that includes a magnetic susceptor incorporated into a leading edge of the truss-braced wing.

FIG. 5 schematically shows an example embodiment of an ice protection system 500 for a truss-braced wing 502 that includes a magnetic susceptor 504 incorporated into a leading edge 506 of the truss-braced wing 502 that is susceptible to ice formation. The ice protection system 500 further includes an erosion shield 508, a an induction heating coil 510, a concentrator 512, and a composite structure 514.

The erosion shield 508 is configured to protect one or more components of the ice protection system 500 from degradation effects caused by the environment.

The magnetic susceptor 504 is positioned adjacent to the erosion shield 508 within the truss-braced wing 502. The magnetic susceptor 504 is shaped to conform to the shape of the erosion shield 508. The magnetic susceptor 504 comprises a ferromagnetic material that is configured to absorb EM energy and convert the electromagnetic energy into heat via induction in order to inhibit ice accumulation on the leading edge 506 of the truss-braced wing 502. In some embodiments, the magnetic susceptor 504 comprises an alloy that is selected for having a Curie temperature that is less than a minimum temperature at which a material of the truss-braced wing 502 becomes degraded due to excessive heating. In some embodiments, the magnetic susceptor 504 is configured such that a magnetic permeability of the magnetic susceptor 504 varies throughout the magnetic susceptor 504.

The induction heating coil 510 is positioned adjacent to the magnetic susceptor 504 within the truss-braced wing 502. The induction heating coil 510 is shaped to conform to the shape of the magnetic susceptor 504. The induction heating coil 510 is electrically coupled to an AC power source, such as the controller 204. The controller 204 drives the induction heating coil 510 with a high-frequency AC excitation current to generate an EM field in the induction heating coil 510 that induces eddy currents to flow through the magnetic susceptor 504 to cause joule heating of the magnetic susceptor 504 in order to inhibit ice accumulation on the leading edge 506 of the truss-braced wing 502.

In some embodiments, the ice protection system 500 includes a concentrator 512 that is positioned adjacent to the induction heating coil 510 within the truss-braced wing 502. The concentrator 512 is shaped to conform to the shape of the induction heating coil 510. The concentrator 512 is configured to modify the magnetic flux to increase the efficiency of the joule heating of the induction heating coil 510. In some configurations, the concentrator 512 may be installed to reflect, or focus, the magnetic field created by the induction heating coil 510 towards the magnetic susceptor 504. Also, the concentrator 512 may help to insulate other components (not shown) from the magnetic field created by the induction heating coil 510.

The composite structure 514 is configured to support the various components of the ice protection system 500 on the truss-braced wing 502. In some embodiments, the magnetic susceptor 504 comprises an alloy that is selected for having a Curie temperature that is based on a material of the composite structure 514, so as not to overheat the composite structure 514 when providing ice protection functionality via induction heating.

The magnetic susceptor has been described herein as being incorporated into a joint, an aerodynamic fairing, and/or a leading edge of a truss-braced wing. Note that a magnetic susceptor may be incorporated into any suitable structure of a truss-braced wing or another part of an aircraft in order to provide ice protection functionality via induction heating. As one example, in some embodiments, one or more magnetic susceptors can be disposed on or within a support strut of a truss-braced wing to provide induction heating functionality in order to protect the support strut from ice accumulation. Other locations can include, but are not limited to, various control surfaces, detection and measurement equipment (such as airspeed probes), and surfaces proximate to an engine intake.

Figure 6:
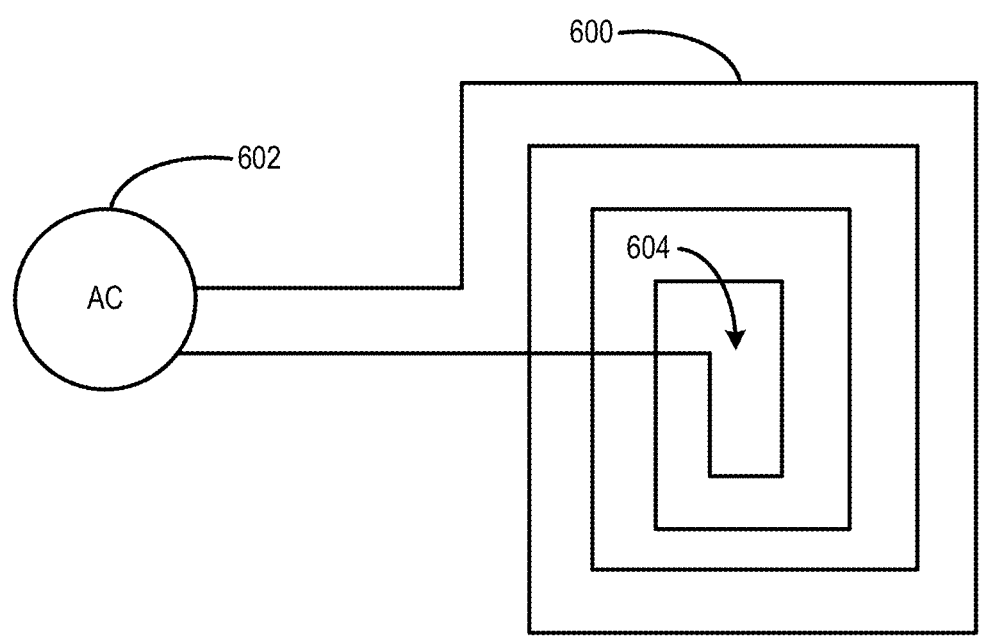
FIG. 6-8 schematically show example embodiments of different types of induction heating coil arrangements that may be employed in an ice protection system for a truss-braced wing of the present disclosure.
Figure 7:
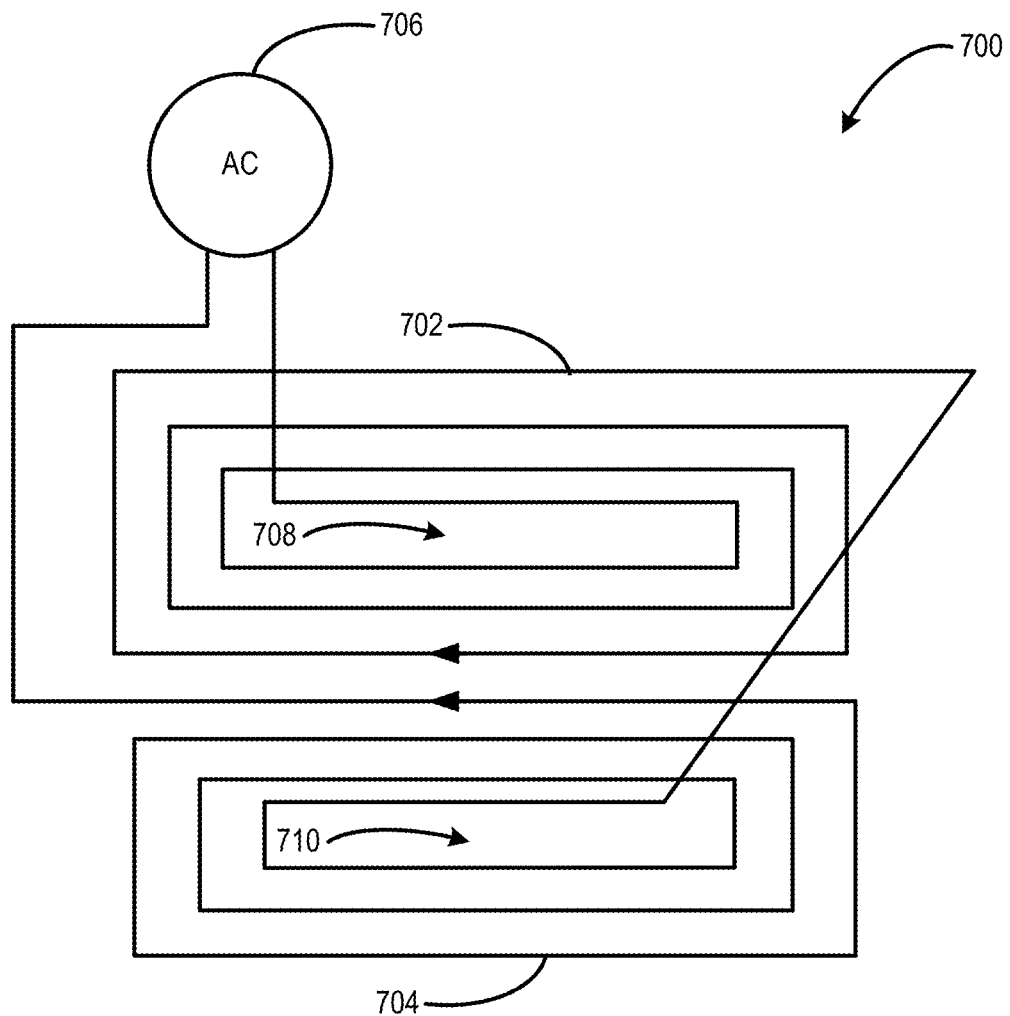

Different types of induction heating coil arrangements may be employed in an ice protection system in different embodiments. FIG. 5-7 schematically show example embodiments of different types of induction heating coil arrangements that may be employed in an ice protection system for a truss-braced wing of the present disclosure.

FIG. 6 schematically shows an example embodiment of an induction heating coil 600. The induction heating coil 600 has a spiral "pancake" type arrangement that allows for the induction heating coil 600 to lay flat and have an approximate thickness that corresponds to the diameter of the coil itself. The induction heating coil 600 is electrically coupled to an AC power source 602, such as the controller 204 shown in FIG. 2. The AC power source 602 drives the induction heating coil with a high-frequency AC excitation current to generate an EM field in the induction heating coil 600 that induces eddy currents to flow through a proximate magnetic susceptor to cause joule heating of the magnetic susceptor to inhibit ice accumulation. This arrangement of the induction heating coil 600 produces a cold spot 604 in a center region of the induction heating coil 600.

FIG. 7 schematically shows another example embodiment of an induction heating coil 700. The induction heating coil 700 includes a first coil 702 and a second coil 704. The first and second coils 702, 704 have spiral "pancake" type arrangements that allows for the induction heating coil 700 to lay flat and have an approximate thickness that corresponds to the diameter of the coils themselves. The first and second coils 702, 704 are electrically connected to an AC source 706 such that current flows in the same direction through both the first and second coils 702, 704. The arrows show the relative direction of current flowing through the first and second coils 702, 704 at a given instant in time. The AC power source 706 drives the induction heating coil 700 with a high-frequency AC excitation current to generate an EM field in the induction heating coil 700 that induces eddy currents to flow through a proximate magnetic susceptor to cause joule heating of the magnetic susceptor to inhibit ice accumulation. This arrangement of the induction heating coil 700 produces relative cold spots in a first region 708 and a second region 710 of the induction heating coil 700. These cold spots 708, 710 are offset relative to the cold spot 504 produced by the induction heating coil 500 shown in FIG. 5. The particular arrangement of the induction heating coil employed in an ice protection system can be selected based at least on where the cold spot(s) reside relative to a structure of a truss-braced wing in which the induction heating coil of the ice protection system is employed.

Figure 8:
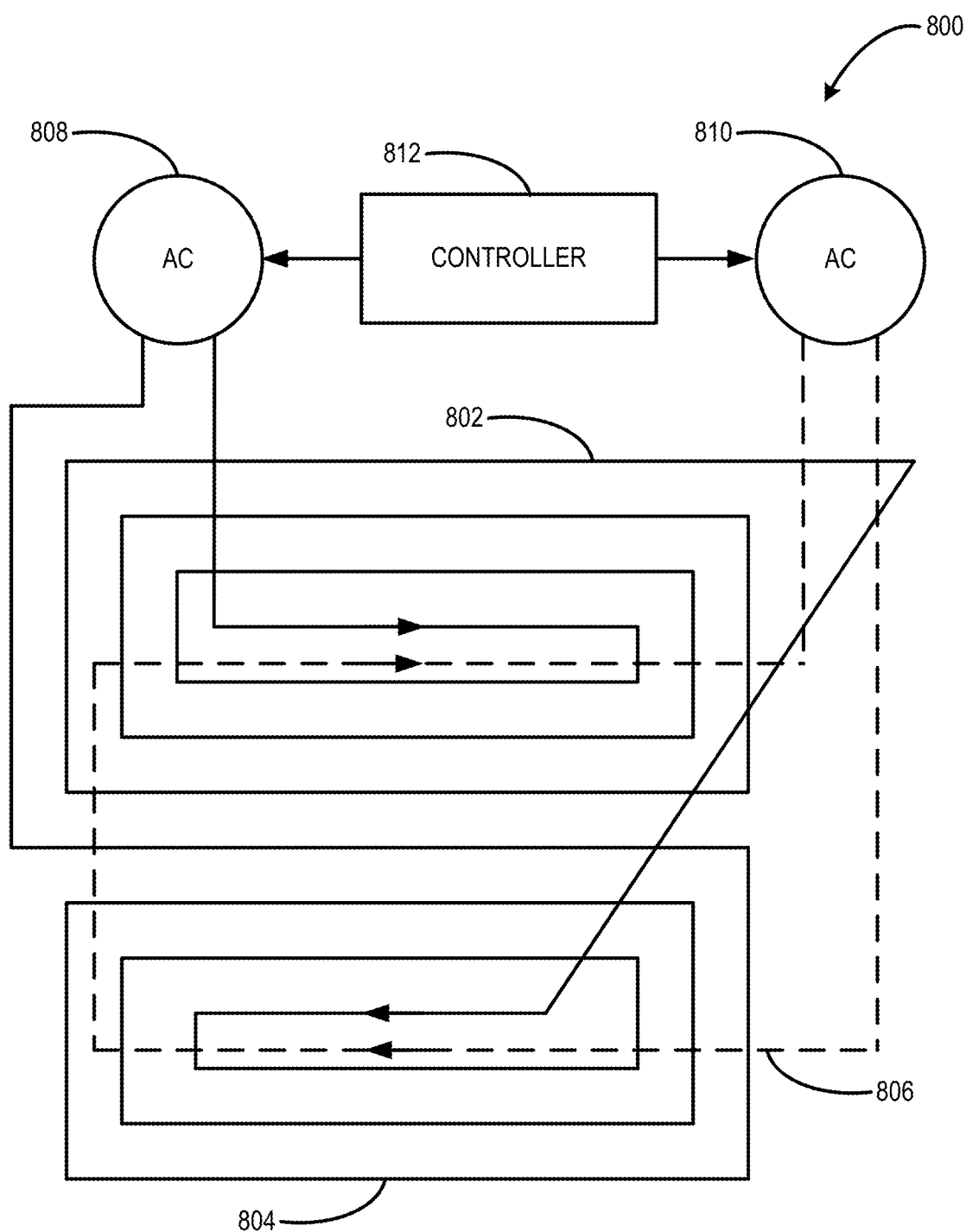

FIG. 8 schematically shows another example embodiment of an induction heating coil 800. The induction heating coil 800 includes a first coil 802, a second coil 804, and a third coil 806. The first, second, and third coils 802, 804, 806 have a spiral "pancake" type arrangement that allows for the induction heating coil 800 to lay flat and have an approximate thickness that corresponds to the diameter of the coils themselves. The first and second coils 802, 804 are electrically connected to a first AC power source 808. The third coil 806 is electrically connected to a second AC power source 810. The arrows show the relative direction of current flowing through the first, second, and third coils 802, 804, 806 at a given instant in time.

The first AC power source 808 and the second AC power source 810 are connected to a controller 812. The controller 812 is configured to control the first AC power source 808 to drive the first and second coils 802, 804 with a first high-frequency AC excitation current having a first frequency and a first phase to generate an EM field in the induction heating coil 800 that induces eddy currents to flow through a proximate magnetic susceptor to cause joule heating of the magnetic susceptor to inhibit ice accumulation. The controller 812 is further configured to control the second AC power source 810 to drive the third coil 806 with a second high-frequency AC excitation current having a second frequency and a second phase that are different that the first frequency and the first phase of the first high-frequency AC excitation current. The offset in frequency and phase between the two high-frequency AC excitation current results in an average heating of the third coil 806 being additive to an average heating of the first and second coils 802, 804 such that the induction heating coil 800 does not produce any cold spots. If all three coils were driven at the same frequency with constant phase difference, the cold spots of the coil pair would not be eliminated, but merely moved to a different location. The induction heating coil 800 provides induction heating in an ice protection system without generating any cold spots, however the induction heating coil 800 may have increased cost and complexity relative to the induction heating coil 600 shown in FIG. 6 and the induction heating coil 700 shown in FIG. 7.

The heating coils shown in FIGS. 6-8 may have any suitable pitch and/or length to provide enough EM energy to a magnetic susceptor to provide joule heating for ice protection on and around the magnetic susceptor. Such pitch/length of the induction heating coils may be dependent on where on the aircraft the magnetic susceptor is located (e.g., a joint, an aerodynamic fairing, a leading edge of a wing).

The ice protection systems of the present disclosure are more effective and efficient at inhibiting ice accumulation on a truss-braced wing of an aircraft, and more particularly, a joint of a truss-braced wing than conventional ice protection systems used for protection a cantilevered wing of an aircraft from ice accumulation. Such ice protection systems employ induction heating via a magnetic susceptor. In particular, eddy currents are induced in the magnetic susceptor causing joule heating of the magnetic susceptor to inhibit accumulation of ice on the joint (and other parts of) the truss-braced wing. Use of the magnetic susceptor in the ice protection system provides the technical benefit of being able to integrate the magnetic susceptor into the structure of the joint of the truss-braced wing so as not to negatively affect aerodynamics of the truss-braced wing or laminar flow across the truss-braced wing, whereas fasteners of conventional electric heating mats would negatively affect aerodynamics and/or laminar flow.

Furthermore, the magnetic susceptor can be configured such that a Curie temperature of the magnetic susceptor is selected based at least on the material of the truss-braced so that the magnetic susceptor can intelligently heat the truss-braced wing up to the Curie temperature without causing degradation of the material of the truss-braced wing due to excessive heating.

Use of the induction heating coil to heat the magnetic susceptor without having to be in direct physical contact with the magnetic susceptor provides the technical benefit of having design flexibility to accommodate the slender internal dimensions of the truss-braced wing. For example, the induction heating coil can have a low profile (e.g., the thickness of the coil) and merely requires an electrical connection to a controller via a cable that can be flexibility fed through the internal dimension of the truss-braced wing. Such an ice protection system provides more design flexibility and has reduced weight and cost relative to a conventional bleed air system that requires a series of ducts to be arranged internally within a wing.

The ice protection systems of the present disclosure have been described herein mainly in the context of protection a joint of a truss-braced wing of an aircraft from ice accumulation. Generally, the ice protections systems of the present disclosure may be employed to protect any joint in a vicinity of an aerodynamic surface, or any joint subject to ice formation where ice can alter required aerodynamic flow. Additionally, the concepts described herein are broadly applicable to protecting other parts of a wing beyond just a joint from ice accumulation. Moreover, in embodiments where the truss-braced wing comprises composite structures, a magnetic susceptor can be disposed on such composite structures to protect the composite structure from both rain erosion and ice accumulation. Furthermore, the concepts described herein are broadly applicable to protection other parts of an aircraft from ice accumulation (or even protecting other types of vehicles in other applications from ice accumulation, such as space or marine applications).

In an example, an ice protection system for a truss-braced wing of an aircraft comprises a wing, a support strut, a joint coupling the support strut to the wing to form a structural truss of the truss-braced wing, a magnetic susceptor disposed on or within the joint, and an induction heating coil disposed on or within the truss-braced wing, wherein the induction heating coil is configured to generate eddy currents inside the magnetic susceptor based on being driven with an alternating current (AC) excitation current, and wherein the eddy currents circulate through the magnetic susceptor causing joule heating of the magnetic susceptor to inhibit ice accumulation on the joint. In this example and/or other examples, the magnetic susceptor may be incorporated into the joint that couples the support strut to the wing. In this example and/or other examples, the magnetic susceptor may comprise an alloy having a Curie temperature that is less than a minimum temperature at which a material of the truss-braced wing becomes degraded due to excessive heating. In this example and/or other examples, a magnetic permeability of the magnetic susceptor may vary throughout the magnetic susceptor. In this example and/or other examples, the magnetic susceptor may be additively manufactured to achieve the varying magnetic permeability of the magnetic susceptor. In this example and/or other examples, an exterior portion of the magnetic susceptor may have a higher magnetic permeability than an interior portion of the magnetic susceptor. In this example and/or other examples, the truss-braced wing may comprise a composite skin, and the induction heating coil may be disposed within the truss-braced wing such that the composite skin is positioned intermediate the induction heating coil and the magnetic susceptor. In this example and/or other examples, the system may further comprise an aerodynamic fairing at least partially covering the joint, the magnetic susceptor may be disposed on or within the aerodynamic fairing, and the induction heating coil may be disposed underneath the aerodynamic fairing. In this example and/or other examples, the system may further comprise a controller electrically coupled to the induction heating coil and configured to drive the induction heating coil with the AC excitation current at a fixed voltage and a fixed frequency. In this example and/or other examples, the system may further comprise a controller electrically connected to the induction heating coil and configured to 1) drive the induction heating coil with the AC excitation current, 2) sense an impedance of the induction heating coil, and 3) adjust a parameter of the AC excitation current based on the sensed impedance of the induction heating coil.

In another example, an ice protection system for a truss-braced wing of an aircraft comprises a wing, a support strut, a magnetic susceptor joint coupling the support strut to the wing to form a structural truss of the truss-braced wing, an induction heating coil disposed on or within the truss-braced wing, and a controller electrically connected to the induction heating coil and configured to drive the induction heating coil with an alternating current (AC) excitation current, sense an impedance of the induction heating coil, and adjust a parameter of the AC excitation current based on the sensed impedance of the induction heating coil, wherein the induction heating coil is configured to generate eddy currents inside the magnetic susceptor based on being driven with the AC excitation current, and wherein the eddy currents circulate through the magnetic susceptor joint causing joule heating of the magnetic susceptor joint to inhibit ice accumulation on the magnetic susceptor joint. In this example and/or other examples, the magnetic susceptor joint may comprise an alloy having a Curie temperature that is less than a minimum temperature at which a material of the truss-braced wing becomes degraded due to excessive heating. In this example and/or other examples, a magnetic permeability of the magnetic susceptor joint may vary throughout the magnetic susceptor. In this example and/or other examples, the magnetic susceptor joint may be additively manufactured to achieve the varying magnetic permeability of the magnetic susceptor joint. In this example and/or other examples, an exterior portion of the magnetic susceptor joint may have a higher magnetic permeability than an interior portion of the magnetic susceptor joint. In this example and/or other examples, the truss-braced wing may comprise a composite skin, and the induction heating coil may be disposed within the truss-braced wing such that the composite skin is positioned intermediate the induction heating coil and the magnetic susceptor joint.

In yet another example, an ice protection system for a truss-braced wing of an aircraft comprises a wing, a support strut, a joint coupling the support strut to the wing to form a structural truss of the truss-braced wing, a magnetic susceptor disposed on or within the truss-braced wing, wherein a magnetic permeability of the magnetic susceptor varies throughout the magnetic susceptor, and an induction heating coil disposed on or within the truss-braced wing, wherein the induction heating coil is configured to generate eddy currents inside the magnetic susceptor based on being driven with an alternating current (AC) excitation current, and wherein the eddy currents circulate through the magnetic susceptor causing joule heating of the magnetic susceptor to inhibit ice accumulation on the joint. In this example and/or other examples, the magnetic susceptor may be incorporated into the joint that couples the support strut to the wing. In this example and/or other examples, the magnetic susceptor may be additively manufactured to achieve the varying magnetic permeability of the magnetic susceptor. In this example and/or other examples, an exterior portion of the magnetic susceptor may have a higher magnetic permeability than an interior portion of the magnetic susceptor.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. An ice protection system for a truss-braced wing of an aircraft, the system comprising:
    a wing;
    a support strut;
    a joint coupling the support strut to the wing to form a structural truss of the truss-braced wing;
    a magnetic susceptor disposed on or within the joint; and
    an induction heating coil disposed on or within the truss-braced wing, wherein the induction heating coil is configured to generate eddy currents inside the magnetic susceptor based on being driven with an alternating current (AC) excitation current, and wherein the eddy currents circulate through the magnetic susceptor causing joule heating of the magnetic susceptor to inhibit ice accumulation on the joint.

2. The system of claim 1, wherein the magnetic susceptor is incorporated into the joint that couples the support strut to the wing.

3. The system of claim 1, wherein the magnetic susceptor comprises an alloy having a Curie temperature that is less than a minimum temperature at which a material of the truss-braced wing becomes degraded due to excessive heating.

4. The system of claim 1, wherein a magnetic permeability of the magnetic susceptor varies throughout the magnetic susceptor.

5. The system of claim 4, wherein the magnetic susceptor is additively manufactured to achieve the varying magnetic permeability of the magnetic susceptor.

6. The system of claim 4, wherein an exterior portion of the magnetic susceptor has a higher magnetic permeability than an interior portion of the magnetic susceptor.

7. The system of claim 1, wherein the truss-braced wing comprises a composite skin, and wherein the induction heating coil is disposed within the truss-braced wing such that the composite skin is positioned intermediate the induction heating coil and the magnetic susceptor.

8. The system of claim 1, further comprising:
    an aerodynamic fairing at least partially covering the joint, wherein the magnetic susceptor is disposed on or within the aerodynamic fairing, and wherein the induction heating coil is disposed underneath the aerodynamic fairing.

9. The system of claim 1, further comprising:
    a controller electrically coupled to the induction heating coil and configured to drive the induction heating coil with the AC excitation current at a fixed voltage and a fixed frequency.

10. The system of claim 1, further comprising:
    a controller electrically connected to the induction heating coil and configured to 1) drive the induction heating coil with the AC excitation current, 2) sense an impedance of the induction heating coil, and 3) adjust a parameter of the AC excitation current based on the sensed impedance of the induction heating coil.

11. An ice protection system for a truss-braced wing of an aircraft, the system comprising:
    a wing;
    a support strut;
    a magnetic susceptor joint coupling the support strut to the wing to form a structural truss of the truss-braced wing;
    an induction heating coil disposed on or within the truss-braced wing; and
    a controller electrically connected to the induction heating coil and configured to:
        drive the induction heating coil with an alternating current (AC) excitation current;
        sense an impedance of the induction heating coil; and
        adjust a parameter of the AC excitation current based on the sensed impedance of the induction heating coil, wherein the induction heating coil is configured to generate eddy currents inside the magnetic susceptor based on being driven with the AC excitation current, and wherein the eddy currents circulate through the magnetic susceptor joint causing joule heating of the magnetic susceptor joint to inhibit ice accumulation on the magnetic susceptor joint.

12. The system of claim 11, wherein the magnetic susceptor joint comprises an alloy having a Curie temperature that is less than a minimum temperature at which a material of the truss-braced wing becomes degraded due to excessive heating.

13. The system of claim 11, wherein a magnetic permeability of the magnetic susceptor joint varies throughout the magnetic susceptor.

14. The system of claim 13, wherein the magnetic susceptor joint is additively manufactured to achieve the varying magnetic permeability of the magnetic susceptor joint.

15. The system of claim 13, wherein an exterior portion of the magnetic susceptor joint has a higher magnetic permeability than an interior portion of the magnetic susceptor joint.

16. The system of claim 11, wherein the truss-braced wing comprises a composite skin, and wherein the induction heating coil is disposed within the truss-braced wing such that the composite skin is positioned intermediate the induction heating coil and the magnetic susceptor joint.

17. An ice protection system for a truss-braced wing of an aircraft, the system comprising:
    a wing;
    a support strut;
    a joint coupling the support strut to the wing to form a structural truss of the truss-braced wing;
    a magnetic susceptor incorporated into the joint that couples the support strut to the wing, wherein a magnetic permeability of the magnetic susceptor varies throughout the magnetic susceptor; and
    an induction heating coil disposed on or within the truss-braced wing, wherein the induction heating coil is configured to generate eddy currents inside the magnetic susceptor based on being driven with an alternating current (AC) excitation current, and wherein the eddy currents circulate through the magnetic susceptor causing joule heating of the magnetic susceptor to inhibit ice accumulation on the joint.

18. The system of claim 17, wherein the magnetic susceptor is additively manufactured to achieve the varying magnetic permeability of the magnetic susceptor.

19. The system of claim 17, wherein an exterior portion of the magnetic susceptor has a higher magnetic permeability than an interior portion of the magnetic susceptor.

20. The system of claim 17, wherein the magnetic susceptor comprises an alloy having a Curie temperature that is less than a minimum temperature at which a material of the truss-braced wing becomes degraded due to excessive heating.

* * * * *